No. 39,889.  
PATENTED SEPT. 15, 1863.

C. P. CROSSMAN.  
CASTER BOTTLE.

Witnesses:  
J. W. Coombs  
Geo. W. Reed

Inventor  
C. P. Crossman  
per Munn & Co.  
atty's

UNITED STATES PATENT OFFICE.

C. P. CROSSMAN, OF WEST WARREN, MASSACHUSETTS.

IMPROVED CASTER-BOTTLE.

Specification forming part of Letters Patent No. 39,889, dated September 15, 1863.

*To all whom it may concern:*

Be it known that I, C. P. CROSSMAN, of West Warren, in the county of Worcester and State of Massachusetts, have invented a new and useful Improvement in Salt-Boxes, Casters, &c.; and I do hereby declare that the following is a full, clear, and exact description of the same, reference being had to the accompanying drawings, forming a part of this specification, in which—

Figure 1:
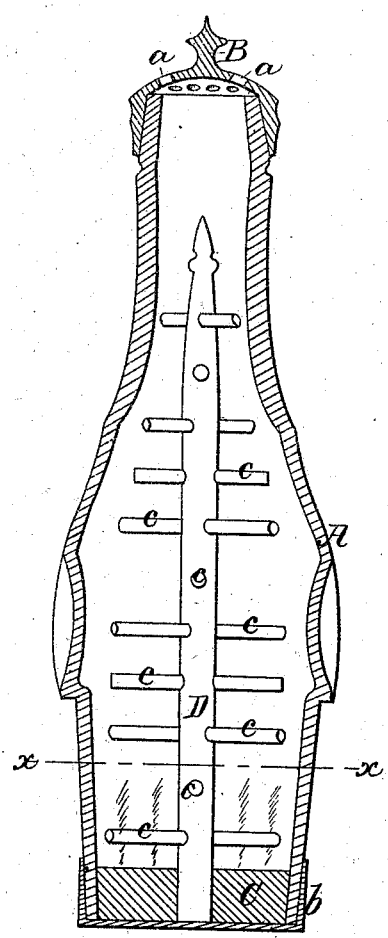
Figure 2:
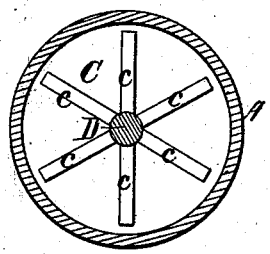

Figure 1 represents a vertical central section of my invention. Fig. 2 is a horizontal section of the same, taken in the plane indicated by the line $x\,x$, Fig. 1.

Similar letters of reference in both views indicate corresponding parts.

The object of this invention is to prevent the salt in a salt-box from forming into lumps and clogging up the perforations in the cover of the box.

The invention consists in the employment or use in a salt-box of a stationary obstruction formed by a series of arms extending across the box, or by wires, or any other equivalent means, in such a manner that the salt will be pulverized by coming in contact with said obstruction whenever the box is shaken, and a free discharge of the same through the openings in the cover can be insured.

To enable those skilled in the art to make and use my invention, I will proceed to describe it.

A represents a salt-box, made of glass or any other suitable material, in the form of a caster, as shown in the drawings, or in any other desirable shape, and provided with a cover, B, which is perforated with a series of holes, $a$. The bottom of the box is formed by a piece of cork, C, which is or may be held in place by a metal cap, $b$. From the center of the bottom C rises a stem, D, provided with a series of arms, $c$, which extend transversely through the stem in various directions close to the inner surface of the box. If the salt in the box forms into lumps, it is only necessary to shake said box, and as the salt comes in contact with the arms it is finely pulverized and passes readily through the holes in the cover. The clogging up of the salt can thus be prevented and a free discharge of the contents insured.

It is obvious that the construction or shape of the obstruction D $c$ in the box can be altered in various forms without altering the result. The central stem may be attached to the cover, instead of the bottom of the box, and the arms, instead of being composed of straight bars, may be made in the form of one or more spirals, or they may be attached to the sides of the box, instead of to the stem, and the stem may be dispensed with altogether. All such alterations will not alter the result, and consequently I consider the same mechanical equivalents of the obstruction D $c$ represented in the drawings.

It is needless to remark that this improvement may be applied with advantage to pepper-boxes, or in fact to all boxes containing a substance in the shape of powder and liable to form into lumps.

What I claim as new, and desire to secure by Letters Patent, is—

The application of the obstruction D $c$, or its equivalent, to a box, A, constructed and operating in the manner and for the purpose substantially as set forth.

C. P. CROSSMAN.

Witnesses:
JAMES S. DAVIS,
TIMOTHY JANES.